United States Patent
Schroder

(10) Patent No.: US 9,344,893 B2
(45) Date of Patent: May 17, 2016

(54) METHOD AND DEVICE FOR MANAGING A PRIVATE RADIO CELL

(75) Inventor: Sonke Schroder, Munich (DE)

(73) Assignee: GIESECKE Sc DEVRIENT GMBH, Munich (DE)

( * ) Notice: Subject to any disclaimer, the term of this patent is extended or adjusted under 35 U.S.C. 154(b) by 636 days.

(21) Appl. No.: 13/390,993

(22) PCT Filed: Aug. 16, 2010

(86) PCT No.: PCT/EP2010/061896
§ 371 (c)(1),
(2), (4) Date: Feb. 17, 2012

(87) PCT Pub. No.: WO2011/020816
PCT Pub. Date: Feb. 24, 2011

(65) Prior Publication Data
US 2012/0149336 A1    Jun. 14, 2012

(30) Foreign Application Priority Data
Aug. 17, 2009 (DE) .......................... 10 2009 037 761

(51) Int. Cl.
*H04W 12/08*    (2009.01)
*H04W 84/04*    (2009.01)

(52) U.S. Cl.
CPC ............ *H04W 12/08* (2013.01); *H04W 84/045* (2013.01)

(58) Field of Classification Search
CPC .................................................... H04W 12/06
USPC ........................................................ 455/411
See application file for complete search history.

(56) References Cited

U.S. PATENT DOCUMENTS

| | | | |
|---|---|---|---|
| 2006/0035707 A1* | 2/2006 | Nguyen et al. | 463/29 |
| 2006/0137005 A1* | 6/2006 | Park | 726/21 |
| 2007/0270152 A1 | 11/2007 | Nylander et al. | |
| 2008/0076386 A1 | 3/2008 | Khetawat et al. | |
| 2008/0207171 A1* | 8/2008 | van Willigenburg et al. | 455/411 |
| 2009/0119762 A1 | 5/2009 | Thomson et al. | |

FOREIGN PATENT DOCUMENTS

| | | |
|---|---|---|
| WO | 0031679 A1 | 6/2000 |
| WO | 2007/040449 A1 | 4/2007 |
| WO | 2009/045335 A2 | 4/2009 |

OTHER PUBLICATIONS

International Search Report in PCT/EP2010/061896, Feb. 28, 2011.

* cited by examiner

*Primary Examiner* — Muthuswamy Manoharan
(74) *Attorney, Agent, or Firm* — Workman Nydegger

(57) ABSTRACT

A method for remotely managing a private radio cell connected to a public radio network, wherein an end device unknown to the radio cell authenticates itself to an access computer of the private radio cell. After successful authentication of the unknown end device, the access computer transfers a first message to a communication device managing the private radio cell with the first message requesting the use of the private radio cell by the unknown end device or of an installation linked with the private radio cell. The managing communication device transfers to the access computer or the unknown end device a second message permitting the use, when the requested use of the private radio cell by the unknown end device or its user is complied with. The requested use of the private radio cell by the unknown end device or its user is refused when it is not complied with by the communication device.

15 Claims, 1 Drawing Sheet

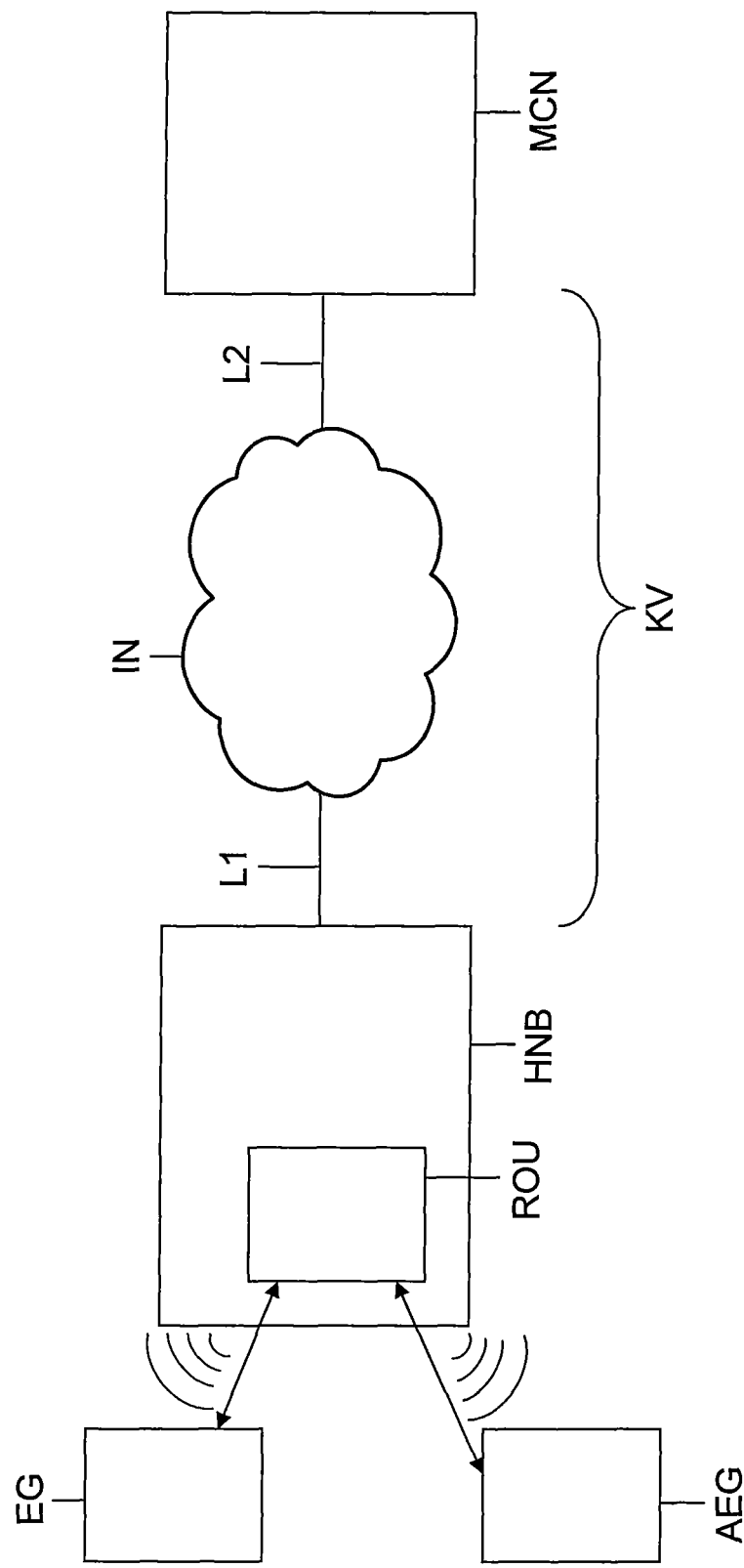

METHOD AND DEVICE FOR MANAGING A PRIVATE RADIO CELL

BACKGROUND OF THE INVENTION

A. Field of the Invention

This invention relates to a method and an apparatus for remotely managing a private radio cell which is connected to a public radio network. The invention relates further to an access computer for a private radio cell and to an end device.

B. Related Art

A private radio cell comprises a transmitting and receiving station which is employed in relatively small, private areas, such as e.g. a building, and expands a radio network of a public mobile network operator. The use of the private radio cell is possible with devices of corresponding communication standards. The benefit of a private radio cell lies, inter alia, in the opening up of places that are difficult to reach by radio technology, but also in the capacity expansion in areas already supplied. The coupling of the private radio cell to the public radio network of the mobile network operator is usually effected via existing private connections, by which the provider of the public radio network saves costs for leased lines.

The management of such a private radio cell is typically effected by an administrator who is connected to a control unit (e.g. a gateway computer) of the private radio cell. The management of the private radio cell necessitates the presence of the administrator at the computer, in order e.g. to make the use of the private radio cell possible to an end device unknown to the radio cell.

A private radio cell in a UMTS (Universal Mobile Telecommunication System) communication network is known as a femtocell, whose use is possible with any 3G (third generation)- or UMTS-capable telephone. Such a femtocell is additionally integrated into public mobile radio networks, so that an uninterrupted handoff of connections is effected between the femtocell and the UMTS network. The coupling to the UMTS network is usually effected via a broadband Internet connection. The femtocell is coupled here by cable to a private Internet gateway, normally in the form of a DSL modem.

It is the object of the present invention to state a method and an apparatus which permit an improved management of a private radio cell. Furthermore, there are to be stated an access computer, an end device and an apparatus which facilitate the administration of a private radio cell.

SUMMARY OF THE DISCLOSURE

The invention provides a method for remotely managing a private radio cell which is connected to a public radio network. In the method, an end device unknown to the radio cell authenticates itself vis-à-vis an access computer of the private radio cell. After successful authentication of the unknown end device, the access computer transfers a first message to a communication device managing the private radio cell, said message requesting the use of the private radio cell by the unknown end device or of an installation or facility linked with the private radio cell. The access computer can be for example a router of the radio cell. The managing communication device transfers to the access computer a second message permitting the use, when the requested use of the private radio cell by the unknown end device or its user is complied with. The requested use of the private radio cell is refused by the unknown end device or its user when it is not complied with by the communication device.

The refusal of the use of the private radio cell by the unknown end device can be effected e.g. by the corresponding refusal being conveyed in the form of a datum in the second message which is transferred from the managing communication device to the access computer or the unknown end device.

The method of the invention permits the use or the release of a private radio cell also in the absence of the owner or administrator, because for managing an access authorization the data can be exchanged between conventional mobile radio end devices.

According to an expedient embodiment, the unknown end device, for example a first mobile radio end device, comprises a first application which manages the authentication process vis-à-vis the access computer of the private radio cell. It is in particular expedient here when the application is stored on a secure portable data carrier of the unknown end device. As a portable data carrier there can be employed for example a SIM card (SIM=Subscriber Identity Module). Likewise, it is conceivable to use a secure chip card.

According to a further embodiment, the managing communication device, for example a second mobile radio end device of the administrator of the private radio cell, comprises a second application which manages an access permission for the private radio cell and/or end devices approved for use of the radio cell. The access permission for the private radio cell can be effected here in automated fashion by the managing communication device or manually by the user of the communication device managing the private radio network.

It is further provided that for authentication of the unknown end device or its user by the access computer, data of the unknown end device and/or personal data of the user of the unknown end device are transferred to the access computer and processed thereby. The entire authentication procedure thus takes place between the unknown end device and the access computer of the private radio network. The query on the permission for use is transferred to the managing communication device when the authentication was successful. It must thus only be decided by the managing communication device or its user whether or not the unknown end device will be permitted to use the private radio network.

According to a further expedient embodiment, end devices authenticated vis-à-vis the access computer are stored in a list of the access computer. This makes it possible for the administration of the authorized end devices to be carried out in a simple manner.

A further embodiment provides that a code query is effected during the authentication process by the end device as yet unknown to the access computer. Only after a correct input of the code by the user of the as yet unknown end device is the authentication positively completed, thereby permitting to the end device or its user the use of the private radio cell and/or permitting the access to the installation. In the latter case, this makes it possible for example to prevent access to installations with a stolen end device. To further increase security, it is expedient here when the data of the end device that are necessary for authentication are stored on a secured portable data carrier.

Expediently, the access computer is operated as a component of the installation linked with the private radio cell. Such an installation may be in particular an access control system which releases the access to a protected area only when the unknown end device is located within an area covered by the private radio cell or has been recognized by said cell as authorized with regard to use. This results in an increase of security and in a simplified access control for buildings and rooms through the integration of the access computer into the installation linked with the private radio cell.

It is further expedient when the installation linked with the private radio cell is repeatedly utilized or entered by an already authenticated end device, the access computer transfers a second message to the managing communication device for the administrator's information upon each use or upon each entry. This makes it possible to protect especially security-relevant installations in improved fashion. For example, this is expedient in case of longer absence. Altogether, the security of an access control for buildings or rooms is improved.

In a further embodiment, image data are additionally transferred to the access computer in the first message which is transferred from the unknown end device to the access computer of the private radio cell.

According to a further expedient embodiment, the managed radio cell is a femtocell, i.e. a private UMTS radio cell, whose use is possible with any 3G- or UMTS-capable telephone.

A further expedient embodiment provides that the private radio cell is connected to the public mobile radio network via a wired and/or wireless communication connection. The communication connection between the private radio cell and the public radio network can be effected for example via the Internet via a DSL connection.

The invention further provides an access computer for a private radio cell which is connected to a public radio network. The access computer of the invention is configured to authenticate an end device unknown to the radio cell and, after successful authentication of the unknown end device, to transfer a first message to a communication device managing the private radio cell, said first message requesting the use of the private radio cell by the unknown end device or an installation linked with the private radio cell. The access computer is further configured to receive a second message emitted by the managing communication device and, in dependence thereon, to comply with the requested use of the private radio cell by the unknown end device or its user or to refuse such use.

An end device according to the invention is characterized in that it is configured to authenticate itself vis-à-vis an access computer of a private radio cell which is connected to a public radio network.

An apparatus, according to the invention, for remotely managing a private radio cell which is connected to a public radio network comprises an access computer according to the invention, and a communication device for managing the private radio cell, and an end device of the above-described type.

The invention will hereinafter be explained more closely with reference to an embodiment example.

BRIEF DESCRIPTION OF THE DRAWINGS

The single FIGURE shows in a schematic representation an apparatus, according to the invention, for remotely managing a private radio cell HNB which is connected to a public radio network MCN via a communication connection KV. The public radio network MCN is for example a UMTS mobile radio network (UMTS—Universal Mobile Telecommunication System). The private radio cell is then designated a femtocell, which is configured e.g. according to the standard 3GPP TS 33.820 and is referred to therein as Home (e)NodeB or H(e)NB. The femtocell makes possible the use of a 3G- or UMTS-capable telephone in the area covered by the radio cell (e.g. a building), thereby expanding the public radio network MCN of a mobile network operator. The femtocell HNB is connected for example via a DSL line L1 to the Internet IN. The Internet IN is connected to the public radio network MCN via a further communication connection L2, which can be of wireless or wired nature.

DETAILED DESCRIPTION OF PREFERRED EMBODIMENTS OF THE INVENTION

The femtocell HNB is managed by an administrator who is in possession of a managing communication device AEG. The managing communication device AEG is for example a 3G- or UMTS-capable communication device which can communicate wirelessly with an access computer ROU, for example a femtocell router, of the private radio cell HNB.

The hereinafter described method makes it possible for the user of the managing communication device EG to make possible by remote management the use of the private radio cell HNB by an unknown end device EG, e.g. a 3G- or UMTS-capable communication device. On the unknown end device EG to which the use of the femtocell HNB is to be made possible, there is stored for this purpose an application which makes possible a communication with the access computer ROU with regard to a permission for use. The application is preferably stored on a secured SIM card (SIM=Subscriber Identity Module) of the unknown end device EG. If the user of the end device EG unknown to the femtocell wishes to authenticate himself vis-à-vis the access computer ROU, a corresponding query is transferred from the unknown end device EG to the access computer ROU.

The access computer ROU receives the query, preferably including personal data of the user, and registers the authentication data of the unknown end device EG. The access computer ROU relays the query to the communication device AEG, e.g. in the form of an SMS message directly, i.e. within the femtocell or via the communication connection KV and the public radio network. If the administrator wishes to permit the use of the femtocell to the unknown end device EG, he can do so by a confirmation message, for example an SMS message, which is transferred to the access computer ROU and/or the unknown end device EG. In so doing, the use can be permitted one time or else generally. If the administrator wishes not to permit the use of the femtocell by the end device EG, the use is refused, which can be effected by a corresponding message of the communication device AEG to the access computer ROU and/or the unknown end device EG.

Preferably, there is stored on the communication device AEG of the administrator of the femtocell HNB an application which makes it possible to manage the access computer ROU or the radio interface between authorized end devices and the femtocell HNB. In particular, this gives the administrator of the communication device AEG the possibility to manage via his communication device AEG all functions including the list of the approved users for the femtocell HNB.

This method in particular allows the femtocell to be managed and the use thereof to be made possible or refused to unknown users or end devices also in the absence of the owner or administrator of the femtocell HNB.

The method of the invention can also be employed for managing an installation linked with the private radio cell, for example an access control system for a building or room. Likewise, the installation may be an alarm system. The access computer constitutes here a component of the installation linked with the radio cell, said component asking for an access permission via a remote inquiry with the owner of the radio cell or his managing communication device.

For example, the user of the unknown end device EG asking for permission for use asks for an access permission for a building or a room. This can be effected for example by execution of the corresponding application stored in the unknown end device EG, which transfers a query message to the access computer ROU. Alternatively, the user can actuate a bell button on the building or the room, thereby causing the query message to be generated and transferred to the access computer ROU. The access computer ROU receives the query including the personal data of the user or his unknown end device EG. In particular, the access computer ROU registers the authentication data of the unknown end device EG, which are stored e.g. on its secure portable data carrier (SIM card), and relays the query directly or via the communication connection KV to the managing communication device AEG of the administrator of the installation, if there is not yet stored in the access computer ROU a permission for use for the user or his unknown end device EG. Upon positive confirmation by the administrator via his communication device AEG, the access is released for the user of the unknown end device EG. Upon negative confirmation, the access to the installation is refused.

To increase security, a current photo or video of the entrance area can be sent as well, for checking purposes, employing an MMS (Multimedia Service) for example. This method allows access control for persons who are not, or not yet, stored in a memory of the access computer ROU.

The access computer can also be used as a component of an alarm system for a building or a room, whereby the access is released only when a certain end device is located within a radio range of the private radio cell and is authenticated. In this way it is possible to increase the security for alarm systems. Furthermore, there results a simplified access control for building and rooms. The access to a building or a room is possible only when an end device accordingly released for entry has been registered by the access computer. The released end devices can be stored or administered e.g. in a list in the TrE (Trusted Environment) or in the HPM (Hosting Party Module) of the access computer ROU.

The actual access control unit, such as e.g. an electrical door lock, or an alarm system, is connected to the access computer ROU via a communication connection. The communication connection can be effected selectively via a USB cable, a LAN connection, a WLAN connection or a WUSB connection. As evident from the preceding description, the access computer ROU is employed only for authentication, while the actual access control is effected by the access control unit.

To increase security, there can additionally be effected a PIN query in the end device. Only after correct input is the access released. This prevents e.g. the access to buildings/rooms with a stolen end device EG. The data of the end device EG that are necessary for authentication are expediently stored on the secure SIM card for security reasons. The authentication is expediently effected according to the specifications usual for 3GPP, as are published for example in the TS specification 33.820.

In especially security-relevant areas, a message can for example be transferred to the administrator of the private radio cell by the access computer upon each access to the protected area. For example, this can be expedient in case of longer absence, such as e.g. a vacation. This regularly transferred message can be configured as an SMS message and be transferred either directly from the access computer ROU to the managing communication device AEG or via the communication connection KV and the public radio network thereto.

The invention claimed is:

1. A method for remotely managing a private radio cell (HNB) which is connected to a public radio network (MCN), comprising the steps:
   authenticating an end device (EG) unknown to the radio cell vis-à-vis an access computer (ROU) of the private radio cell (HNB);
   after successful authentication of the unknown end device (EG), transferring via the access computer (ROU) a first message to a mobile communication device (AEG) managing the private radio cell (HNB), said first message requesting the use of the private radio cell (HNB) by the unknown end device (EG) or of an installation linked with the private radio cell (HNB);
   transferring via the managing mobile communication device (AEG) a second message to the access computer (ROU) or the unknown end device (EG), said second message permitting the use of the private radio cell (HNB) by the unknown end device (EG), when the requested use of the private radio cell (HNB) by the unknown end device (EG) or its user is complied with, wherein use of the private radio cell (HNB) allows uninterrupted cellular handoffs between the private radio cell (HNB) and the public radio network (MCN);
   transferring via the access computer (ROU) a third message to the managing communication device (AEG) to inform an administrator upon each use of the installation linked with the private radio cell (HNB) or upon each entry of the unknown end device (EG), when the installation linked with the private radio cell (HNB) is repeatedly used or entered by an already authenticated end device (EG); and
   refusing the requested use of the private radio cell (HNB) by the unknown end device (EG) or its user when it is not complied with by the mobile communication device (AEG).

2. The method according to claim 1, wherein the unknown end device (EG) comprises a first application which manages the authentication process vis-à-vis the access computer (ROU) of the private radio cell (HNB).

3. The method according to claim 2, including storing the application on a secure portable data carrier of the unknown end device.

4. The method according to claim 1, wherein the managing communication device (AEG) comprises a second application, and managing an access permission for the private radio cell (HNB) and/or end devices (EG) approved for use of the radio cell by the second application.

5. The method according to claim 1, wherein for authentication of the unknown end device (EG) or its user by the access computer (ROU), data of the unknown end device (EG) and/or personal data of the user of the unknown end device (EG) are transferred to the access computer (ROU) and processed thereby.

6. The method according to claim 1, wherein end devices (EG) authenticated vis-à-vis the access computer (ROU) are stored in a list of the access computer (ROU).

7. The method according to claim 1, wherein a code query is effected during the authentication process by the end device (EG) as yet unknown to the access computer (ROU).

8. The method according to claim 1, wherein the access computer (ROU) is operated as a component of the installation linked with the private radio cell (HNB).

9. The method according to claim 8, wherein the installation is an access control system which is linked with the private radio cell (HNB).

10. The method according to claim 8, wherein image data are additionally transferred to the access computer (ROU) in the first message.

11. The method according to claim 1, wherein the managed radio cell is a femtocell.

12. The method according to claim 1, wherein the private radio cell (HNB) is connected to the public mobile radio network (MCN) via a wired and/or wireless communication connection (I(V).

13. An access computer for a private radio cell (HNB) which is connected to a public radio network (MCN), comprising a computer configured
- to authenticate an end device (EG) unknown to the radio cell;
- after successful authentication of the unknown end device (EG), to transfer a first message to a mobile communication device (AEG) managing the private radio cell (HNB), said first message requesting the use of the private radio cell (HNB) by the unknown end device (EG) or of an installation linked with the private radio cell (HNB);
- to transfer a second message to the mobile communication device (AEG) to inform an administrator upon each use of the installation linked with the private radio cell (HNB) or upon each entry of the unknown end device (EG), when the installation linked with the private radio cell (HNB) is repeatedly used or entered by an already authenticated end device (EG); and
- to receive a third message emitted by the managing mobile communication device (AEG) and, in dependence thereon, to comply with the requested use of the private radio cell (HNB) by the unknown end device (EG) or its user or to refuse the use, wherein use of the private radio cell (HNB) allows uninterrupted cellular handoffs between the private radio cell (HNB) and the public radio network (MCN).

14. A system for remotely managing a private radio cell (HNB) which is connected to a public radio network (MCN), comprising
- an access computer as recited in claim 13; and
- a mobile communication device (AEG) managing the private radio cell (HNB).

15. A method for remotely managing a private radio cell (HNB) which is connected to a public radio network (MCN), comprising the steps:
- authenticating an end device (EG) unknown to the radio cell vis-à-vis an access computer (ROU) of the private radio cell (HNB);
- after successful authentication of the unknown end device (EG), transferring via the access computer (ROU) a first message to a mobile communication device (AEG) managing the private radio cell (HNB), said first message requesting the use of the private radio cell (HNB) by the unknown end device (EG) or of an installation linked with the private radio cell (HNB);
- transferring via the managing mobile communication device (AEG) a second message to the access computer (ROU) or the unknown end device (EG), said second message permitting the use of the private radio cell (HNB) by the unknown end device (EG), when the requested use of the private radio cell (HNB) by the unknown end device (EG) or its user is complied with; and
- refusing the requested use of the private radio cell (HNB) by the unknown end device (EG) or its user when it is not complied with by the mobile communication device (AEG),
- wherein for authentication of the unknown end device (EG) or its user by the access computer (ROU), data of the unknown end device (EG) and/or personal data of the user of the unknown end device (EG) are transferred to the access computer (ROU) and processed thereby, the end devices (EG) authenticated vis-à-vis the access computer (ROU) being stored in a list of the access computer (ROU), the access computer (ROU) being operated as a component of the installation linked with the private radio cell (HNB), and
- wherein the access computer (ROU) transfers a second message to the managing communication device (AEG) for the administrator's information upon each use or upon each entry, when the installation linked with the private radio cell is repeatedly used or entered by an already authenticated end device (EG).

\* \* \* \* \*